Sept. 1, 1936.  G. R. STURTEVANT  2,053,119
REVERSIBLE METER HANGER SUPPORT
Filed Sept. 18, 1934
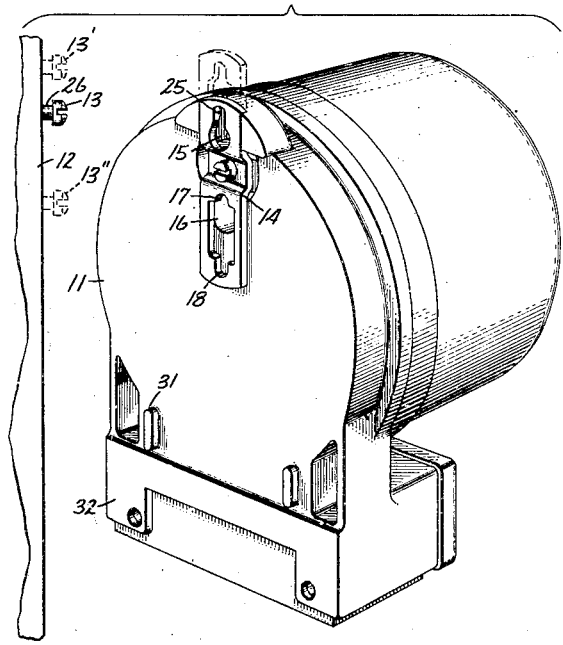
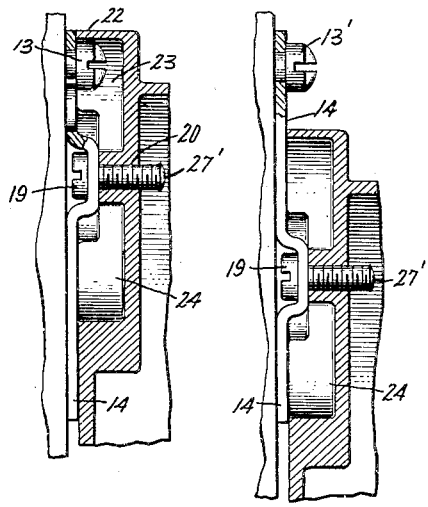
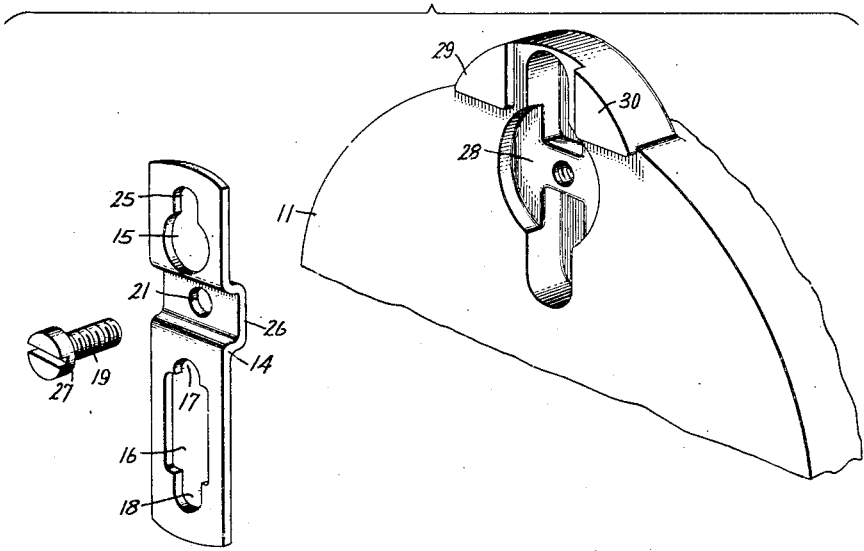
Inventor:
George R. Sturtevant,
by Harry E. Dunham
His Attorney.

Patented Sept. 1, 1936

2,053,119

UNITED STATES PATENT OFFICE 2,053,119

REVERSIBLE METER HANGER SUPPORT

George R. Sturtevant, Lynn, Mass., assignor to General Electric Company, a corporation of New York Application September 18, 1934, Serial No. 744,478

5 Claims. (Cl. 248—223)

My invention relates to arrangements for supporting and mounting meter casings and other apparatus and has for its principal object the provision of a reversible meter hanger which enables the meter to be supported either by an external hanging lug or by a blind buttonhole on the back of the base.

Other and further objects and advantages will become apparent as the description proceeds.

My invention will be understood more readily by referring to the accompanying drawing in connection with the following description and the features of my invention which I believe to be novel and patentable will be pointed out in the claims appended hereto.

In the drawing, Fig. 1 is a view in perspective with a meter casing embodying my invention seen from the rear and shown detached from the wall or panel on which it may be mounted; Fig. 2 is a fragmentary view partially in section illustrating the arrangement of the apparatus for mounting from a blind buttonhole in the back of the base; Fig. 3 is a fragmentary view partially in section illustrating the arrangement for supporting the meter casing from an external hanging lug; and Fig. 4 is an exploded view of the parts of a meter casing embodying my invention.

In the drawing, I have illustrated the application of my invention to the mounting of a device such as a meter casing 11 but it will be understood that my invention is not limited to this specific application.

The meter casing 11 is adapted to be mounted on a wall or panel 12 in which the hanger bolt or screw 13 has been secured. To permit supporting the meter casing 11 from either an external hanging lug or a blind buttonhole, a reversible hanger support 14 is provided having a simple buttonhole slot 15 in a segment at one end of the hanger and a double-ended slot 16 in a segment at the other end of the hanger, the slot 16 having two narrowed portions 17 and 18. The hanger support 14 is attached to the back wall or base of the casing 11 by means of a screw 19 engaging a threaded hole 20 in the base of the meter casing and passing through a smooth hole 21 in the meter hanger 14. The distances between the hole 21 in the hanger 14 and the ends of the hanger 14 and the distance from the top edge 22 to the threaded hole 20 in the meter casing are such that, when the reversible hanger 14 is rotated around the screw 19 to the position with the single buttonhole slot 15 uppermost, the upper end of the hanger 14 is flush with the upper edge 22 of the meter casing 11, as shown in Figs. 1 and 2. However, when the reversible hanger 14 is rotated 180 degrees around the screw 19, the hanger 14 projects upward from the top edge 22 of the meter casing 11 to form an external hanging lug as shown in Fig. 3 and in the dotted lines of Fig. 1.

Preferably, a depression or a pair of depressions 23 and 24 are provided in the back wall of the meter casing 11 to correspond to the positions of the head of the hanger bolt 13 when resting in either of the slots 15 or 16. With the hanger 14 in the position shown in Figs. 1 and 2, the slots 15 and 16 provide blind buttonholes in the back of the meter casing 11 which may be slipped over the head of the hanger bolt 13 to provide a secure support for the meter casing 11. If the slot 16 is used, obviously, the point of support of the meter casing will be lower and the hanger bolt 13 may be in a position 13" to support the meter casing 11 at the same height as when the hanger bolt 13 as shown in full lines is used with the slot 15. Likewise with bolt 13 in the full line position the meter may be supported in a higher position when slot 16 is used. The narrowed portions 25 and 17 of the slots 15 and 16 are of slightly greater width than the shank 26 of the hanger bolt 13 but are less in width than the diameter of the head of the hanger bolt 13 so that the larger portions of the slots 15 or 16 may be slipped over the head of the hanger bolt 13 and the narrow portions may then be dropped down on the shank 26 of the hanger bolt 13 to prevent the meter casing 11 from sliding off the hanger bolt 13. For convenience, I have referred to this type of slot having a narrowed end portion as a buttonhole slot.

In order to provide an external hanging lug, the hanger 14 is rotated to the position shown in Fig. 3 and the narrow portion 18 of the slot 16 in the hanger 14 rests on the hanger bolt 13 to provide a secure support for the meter casing 11. With the hanger bolt in the position 13' shown in Fig. 1, the meter casing is mounted at the same height on wall 12 as in the previous examples.

Preferably, the reversible hanger 14 is offset or transversely channeled at 26 to permit the head 27 of the screw 19 to come flush with or below the outer surface of the hanger 14. To guard against loss of the screw 19 in the hanger 14, the inner end 27' of the screw 19 may be peened over or expanded to a diameter greater than that of the threaded hole 20. It will be understood that a bridge or a boss 28 will be provided in or between the depressions 23 and 24 on the back of the meter casing 11 against which the offset portion 26 of the hanger 14 may rest when the ends of the hanger 14 are flush with the back surface of the meter casing 11. The screw 19 is, of course, loosened when it is desired to rotate the hanger 14 from one position to the other. If desired, studs 29 and 30 may be provided on the back surface of the meter casing 11 to maintain the hanger 14 in either of its two supporting positions. It will be understood that other suitable studs or bosses, such as the portions 31 and 32 are provided on the back surface of the meter casing 11 to cause the meter casing 11 to rest vertically against the wall 12 and to space the back surface of the meter casing 11 slightly from the wall 12 to prevent accumulation of moisture.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. In combination with a meter casing, a reversible hanger support therefor in the form of a strip, means for attaching said hanger at a point unsymmetrical with respect to the ends thereof to the back wall of said casing, said unsymmetrical point defining a division of said strip into a longer segment and a shorter segment, said hanger support having a simple buttonhole slot in the shorter segment thereof and in the other segment thereof a double-ended buttonhole slot having narrowed portions extending toward the opposite ends of said hanger support, said hanger support being rotatably mounted at such a position on said casing as to permit the end of said hanger adjacent the longer segment to extend from the casing as an external hanging lug when rotated to the upward position and to prevent the other end of said hanger support from projecting beyond the casing when said latter end is rotated to the upward position, thereby forming only blind buttonhole slots for mounting the casing.

2. In combination, a meter casing having an elongated depression therein extending vertically, a bridge across said depression, and a reversible hanger support for said casing comprising a strip adapted to be rotatably mounted on the bridge across said depression and comprising a longer and a shorter segment, one segment having a buttonhole slot therein and the other segment having a double-ended buttonhole slot therein, the arrangement being such that when the longer segment of said hanger support is in the downward position, buttonhole slots cooperating with the upper and lower portions of the cavity of said casing are provided above and below the point of attachment of said hanger to said casing but said hanger remains within the outline of the rear wall of said casing and when said hanger is rotated 180 degrees around its point of attachment it forms an upwardly projecting lug with a buttonhole slot therein.

3. In combination with a meter casing, a reversible hanger support therefor comprising a strip having buttonhole slots therein and rotatably mounted at a point unsymmetrical with respect to the ends thereof at such a position on the back of said casing that with the end of the strip uppermost which is more remote from its mounting point, the end of the strip projects and forms an external hanging lug for said casing and with the other end uppermost no part of the hanger projects beyond the casing but a blind buttonhole slot is provided at the back of the casing.

4. In combination with a meter casing, a reversible hanger support therefor comprising a strip having a slot therein with narrowed end portions extending toward the ends of said hanger and rotatably mounted at a point between said slot and one end of said hanger at such a position on the back of said casing that with the slot uppermost the hanger forms an external hanging lug and with the slot lowermost it forms a blind buttonhole slot at the back of the casing and no part of the hanger projects beyond the casing.

5. In combination with a meter casing, a reversible hanger support therefor comprising a strip having an opening therein adapted to cooperate with a hanger bolt for mounting a meter casing and rotatably mounted at a point unsymmetrical with respect to the ends of said hanger at such a position on the back of said casing that with the end of the strip uppermost which is more remote from its mounting point, the end of the strip projects and forms an external hanging lug for said meter casing and with the other end uppermost no part of the hanger projects beyond the casing but a blind mounting slot is provided at the back of the casing.

GEORGE R. STURTEVANT.